US012012324B2

(12) United States Patent
Besche et al.

(10) Patent No.: US 12,012,324 B2
(45) Date of Patent: Jun. 18, 2024

(54) DEVICE AND SANITARY FITTING FOR FILLING A CONTAINER WITH A CARBONATED LIQUID

(71) Applicant: GROHE AG, Hemer (DE)

(72) Inventors: Timo Besche, Witten (DE); Alisha Bockholt, Balve (DE)

(73) Assignee: GROHE AG, Hemer (DE)

( * ) Notice: Subject to any disclaimer, the term of this patent is extended or adjusted under 35 U.S.C. 154(b) by 382 days.

(21) Appl. No.: 17/431,528

(22) PCT Filed: Feb. 5, 2020

(86) PCT No.: PCT/EP2020/052893

§ 371 (c)(1),
(2) Date: Aug. 17, 2021

(87) PCT Pub. No.: WO2020/169347

PCT Pub. Date: Aug. 27, 2020

(65) Prior Publication Data

US 2022/0112065 A1 Apr. 14, 2022

(30) Foreign Application Priority Data

Feb. 20, 2019 (DE) .................... 10 2019 104 229.1

(51) Int. Cl.
*B67C 3/26* (2006.01)
*B01F 23/2361* (2022.01)
(Continued)

(52) U.S. Cl.
CPC ............ *B67C 3/26* (2013.01); *B01F 23/2361* (2022.01); *B01F 23/237621* (2022.01); *B01F 2101/14* (2022.01); *B67C 2003/2602* (2013.01)

(58) Field of Classification Search
CPC . B67C 3/26; B67C 2003/2602; B67C 3/2637; B01F 23/237621; B01F 23/2361
See application file for complete search history.

(56) References Cited

U.S. PATENT DOCUMENTS 3,881,636 A 5/1975 D'Aubreby
4,544,005 A * 10/1985 Meissner ................ B65B 57/04
141/94

(Continued)

OTHER PUBLICATIONS

International Search Report dated Apr. 30, 2020, in International (PCT) Application No. PCT/EP2020/052893, with English translation.

*Primary Examiner* — Timothy L Maust
(74) *Attorney, Agent, or Firm* — Anna-Lisa L. Gallo; Tyler A. Stevenson

(57) ABSTRACT

A device (1) for filling a container (2) with a carbonated liquid, containing at least: an upper part (3) and a lower part (4) having a container port (5) for securing the container (2) to the device (1), wherein the lower part (4) can be displaced within limits relative to the upper part (3) between a closed position (23) and a venting position (6), and wherein the container (2) can displace the lower part (4) to the closed position (23) when the container (2) is secured to the container port (5), and the container (2) can displace the lower part (4) to the venting position (6) when the container (2) is released from the container port (5), such that a high pressure in the container (2) can be reduced in the venting position (6) of the lower part (4) prior to releasing the container (2) from the container port (5).

10 Claims, 2 Drawing Sheets

Figure 1:
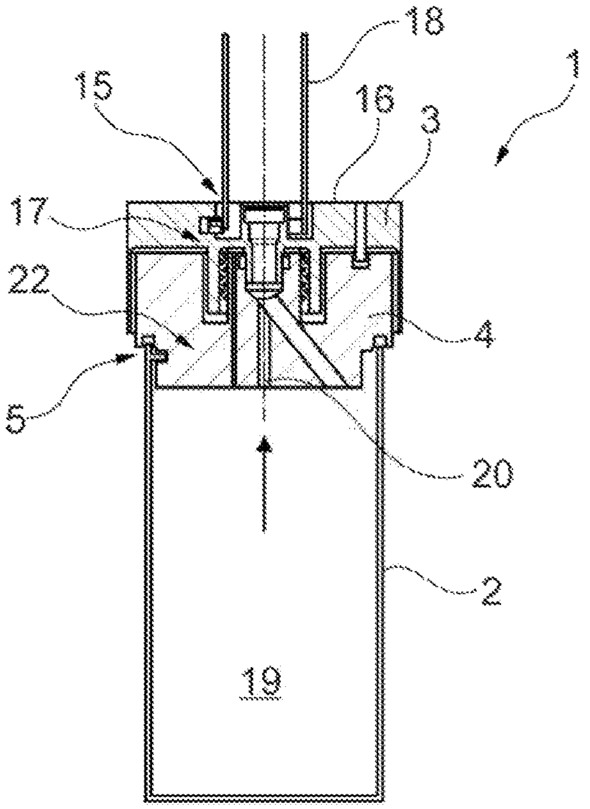

(51) Int. Cl.
*B01F 23/237* (2022.01)
*B01F 101/14* (2022.01)

(56) References Cited

U.S. PATENT DOCUMENTS

| | | | | | |
|---|---|---|---|---|---|
| 5,260,081 | A | * | 11/1993 | Stumphauzer | A23L 2/54<br>261/DIG. 7 |
| 5,275,206 | A | * | 1/1994 | Acker | B67C 3/262<br>141/311 A |
| 5,597,021 | A | * | 1/1997 | Crossdale | B67D 7/0288<br>141/346 |
| 6,109,483 | A | | 8/2000 | Wilke et al. | |
| 6,135,167 | A | * | 10/2000 | Kiholm | B67C 3/2637<br>141/157 |
| 9,114,368 | B2 | * | 8/2015 | Njaastad | B01F 23/231 |
| 9,879,902 | B2 | * | 1/2018 | An | A23L 2/00 |
| 10,307,718 | B2 | * | 6/2019 | Waisman | B01F 35/71805 |
| 10,477,883 | B2 | * | 11/2019 | Giardino | B01F 23/2323 |
| 11,345,580 | B2 | * | 5/2022 | Comin | B67C 3/225 |
| 2004/0050450 | A1 | * | 3/2004 | Lambert | F16L 37/32<br>141/346 |
| 2012/0103468 | A1 | * | 5/2012 | Terwilliger | A61J 1/2096<br>222/548 |
| 2014/0356491 | A1 | | 12/2014 | Giardino | |

* cited by examiner

DEVICE AND SANITARY FITTING FOR FILLING A CONTAINER WITH A CARBONATED LIQUID

This invention relates to a device and a sanitary fitting for filling a container with a carbonated liquid. The invention is particularly useful for providing carbonated beverages in containers, such as bottles.

Devices and sanitary fittings, which are used to mix (drinkable) liquids, such as tap water, with carbon dioxide (CO2) under high pressure in a carbonator tank are commonly known. This so-called carbonation of liquids is used in particular to increase a refreshing effect by stimulating taste cells when drinking the former. The carbonated liquid can then be filled into a container, such as a beverage bottle. To this end, the container is attached to the device or the sanitary fitting, for instance using a bayonet connection, and the carbonated liquid is routed from the carbonator tank to the container through a liquid line. While the container is filled, the pressure in the container increases rendering the container difficult to detach from the device or the sanitary fitting because of the high pressure and the resulting frictional force in the bayonet connection. This results in a loss of comfort when using such devices and sanitary fittings.

Therefore, it is the object of the invention to solve at least part of the problems described with reference to the prior art and, in particular, of providing a device and a sanitary fitting for filling a container with a carbonated liquid, from which a pressurized container can be easily detached.

This object is met by a device and a sanitary fitting according to the features of the independent claims. Further advantageous embodiments of the invention are specified in the dependent claims. It will be appreciated that the features listed individually in the dependent claims may be combined in any technologically useful manner and define further embodiments of the invention. In addition, the features indicated in the claims are further specified and explained in the description, wherein further preferred embodiments of the invention are illustrated.

A device for filling a container with a carbonated liquid, comprising at least the following components, contributes to said object:

a upper part and a lower part comprising a container port for securing the container to the device, wherein the lower part can be displaced within limits relative to the upper part between a closed position and a venting position and wherein the container can displace the lower part to the closed position when the container is secured to the container port, and the container can displace the lower part to the venting position when the container is released from the container port, such that a high pressure in the container can be reduced in the venting position of the lower part prior to releasing the container from the container port.

The device may be, for instance, a dispensing device such as a sanitary faucet, a spout for such a dispensing device, or an adapter that can be connected to such a dispensing device. Such sanitary fittings are used in particular to provide a mixed water supply on demand at a tap, a sink, a wash-basin, a shower and/or a bathtub. For this purpose, the sanitary fitting can be regularly supplied with cold water at a cold-water temperature and hot water at a hot water temperature. The cold-water temperature is in particular at most 25° C. (Celsius), preferably 1° C. to 25° C., particularly preferably 5° C. to 20° C. and/or the hot water temperature is in particular at most 90° C., preferably 25° C. to 90° C., particularly preferably 55° C. to 65° C. The cold water and the hot water can then be mixed by the sanitary fitting, for instance by means of a mixing valve or a thermostatic mixer, to form a mixed water having a desired mixed water temperature. Additionally, the proposed sanitary fitting or device can be used to fill a container, such as a beverage bottle, carafe, or drinking vessel, with a carbonated liquid.

For this purpose, the device has a container port on a lower part for connecting the container to the device. The container port can be used to attach the container to the device in particular in a detachable manner. For this purpose, the container port can be designed, for instance, along the lines of a bayonet connection, screw top closures, snap-on fastener or clamp fastener. Furthermore, a seal can be provided in the area of the container port to connect the container to the device in a liquid-tight and/or gas-tight manner. In this way, the device and the container can form a closed system. The lower part can be displaced within limits relative to an upper part of the device between a closed position and a venting position. In particular, the lower part can be rotated within limits between the closed position and the venting position relative to the upper part. Here, limits means in particular that the lower part cannot be moved or rotated further (in the same direction) than and beyond the closed position or the venting position. For instance, the lower part can be rotated relative to the upper part between the closed position and the venting position at an angle of rotation of 20° to 340°, preferably 20° to 180°, particularly preferably 20° to 90°. When the container is attached to the container port, the container (automatically) moves the lower part to the closed position. For instance, a frictional force may act between the container and the lower part when the container is attached to the container port, i.e., the lower part is moved with the container until the lower part reaches the closed position.

After securing the container to the lower part, the container can be filled with the carbonated liquid. For this purpose, liquid ducts can be formed in the upper and/or lower part, through which liquid ducts the carbonated liquid can be routed to a receiving chamber of the container. For this purpose, a coupling can be used to attach the upper part to an outlet of a sanitary fitting. The outlet can be used to direct the carbonated liquid from a liquid source into the container. The liquid source may be, for instance, a reservoir for the carbonated liquid or a carbonation device for carbonating a liquid, for instance, in the manner of a carbonator tank. The carbonation device can be used to add CO2 to the liquid, in particular under high pressure, to dissolve the CO2 in the liquid. In addition, the device can have at least one pressure relief valve, which can be used to pre-set a set pressure in the container during filling. The set pressure can be, for instance, 1 bar to 20 bar, preferably 1 bar to 8 bar. Before the container is filled, the ambient pressure in the container is approximately 1 bar, for instance. At the beginning of a filling process, the pressure in the vessel increases until the set pressure is reached.

Owing to the high pressure in the container, a high frictional force is created between the container and the lower part, i.e., when the container is released from the container port, the lower part is adjusted or rotated by the container into the venting position. In the venting position of the lower part, the receiving chamber of the container is connected to an environment, for instance by opening a valve, such that the pressure in the container drops to the ambient pressure, e.g. approx. 1 bar, or to an atmospheric pressure. This reduces the frictional force between the container and the lower part to render the container easily detachable from the lower part.

A vent duct of the lower part can be closed in the closed position and open in the venting position. The vent duct can, for instance, be designed in the manner of a bore in the lower part. Furthermore, in the venting position of the lower part, the receiving chamber of the container can be connected to an environment via the vent duct, i.e., gases can escape from the receiving chamber of the container. In the closed position of the lower part, the vent duct is closed, for instance, by a valve or a seal, to prevent gases from escaping from the receiving chamber of the container.

A seal of the upper part can release the vent duct when the lower part is moved to the venting position. For instance, the seal may extend in a direction of motion of the lower part between the closed position and the venting position. Furthermore, the seal can be ring-shaped or ring-segment-shaped. The seal can also be located at a longitudinal end of the vent duct. When moving the lower part to the venting position, the lower part can be moved away from the seal to expose the longitudinal end of the vent duct.

The vent duct can be connected to a connection duct of the upper part when the lower part is moved to the venting position. This can be done, for instance, by aligning the longitudinal end of the vent duct with a longitudinal end of the connection duct of the upper part in the venting position of the lower part. The receiving chamber of the container can then be connected to an environment via the vent duct and the connection duct for gases to escape from the receiving chamber.

A spring element can release the vent duct when the lower part is moved to the venting position. The spring part may be arranged at least partially in the vent duct of the lower part. Furthermore, the spring element can have, in particular at a longitudinal end, a valve head, which, in the closed position of the lower part, can be pressed or pulled onto a valve seat, for instance at a longitudinal end of the vent duct by a spring of the spring element. The spring can be a tension spring in particular. When the lower part is moved to the venting position, the valve head can be lifted off the valve seat to uncover the vent duct. To this end, the spring element can be adjustable by the upper part when the lower part is moved into the venting position.

The spring element can be supported on a ramp of the upper part, which has a gradient in a direction of motion of the lower part. The slope of the ramp can be designed in such a way that the valve head of the spring element is located on the valve seat in the closed position of the lower part and the ramp lifts the valve head off the valve seat in the open position of the lower part.

The upper part and the lower part can be interconnected by a thread. The thread allows the lower part to be adjustable relative to the upper part, in particular in parallel to an axis of rotation of the lower part, during its motion between the venting position and the closed position. In particular, the thread has a smaller diameter than the container port. For instance, the thread may have a diameter no larger than half that of the container port.

A blocking element of the upper part can restrict a movability of the lower part relative to the upper part. The blocking element can, for instance, be designed in the form of a screw, pin or bolt. Furthermore, the blocking element can serve as a stop for the lower part in the venting position and the closing position.

The blocking element can engage in a groove of the lower part. The groove can extend in a direction of motion of the lower part between the venting position and the closed position. The longitudinal ends of the groove end in particular in the closed position or venting position of the lower part.

In accordance with a further aspect of the invention, a sanitary fitting comprising an outlet having an outlet opening is also disclosed, wherein a device according to the invention is arranged at the outlet opening. The sanitary fixture may include a housing that can be attached to a counter-top or sink, for instance. For instance, the spout can be rotatably attached to the housing.

Regarding the details of the sanitary fitting, please refer to the description of the device.

Figure 2:
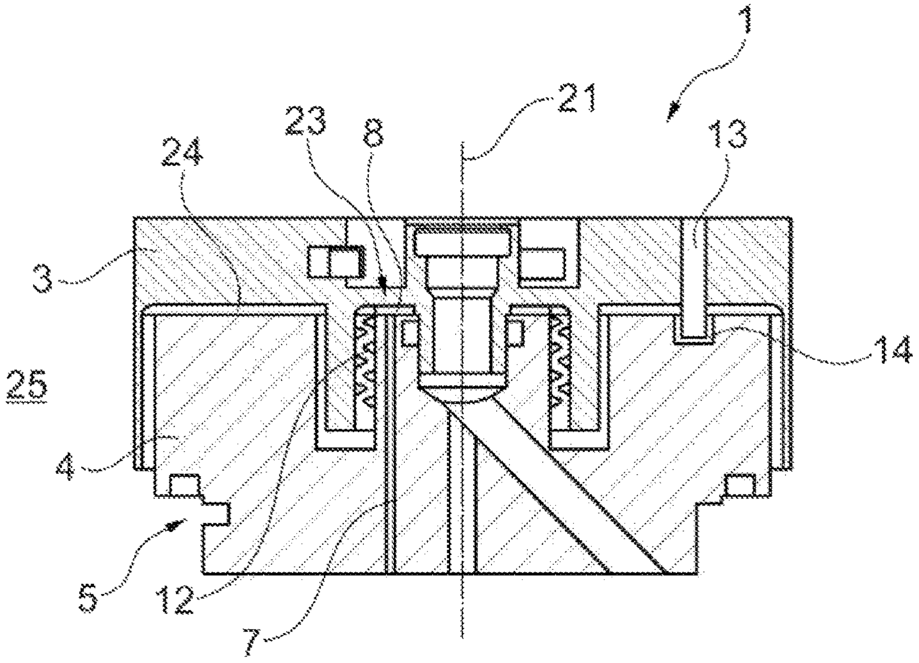
Figure 3:
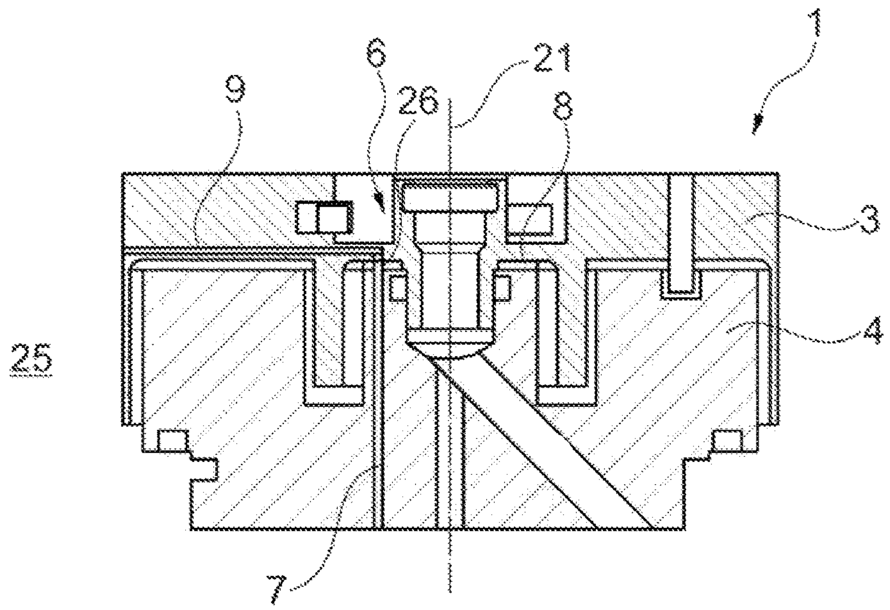

The invention and the technical environment are explained in more detail below with reference to the figures. It should be noted that the figures show particularly preferred embodiment variants of the invention, but the invention is not limited thereto. The same reference signs are used for the same components in the figures. Shown are in an exemplary and schematic manner in:

FIG. 1 a first presentation of a first variant of a device for filling a container;

FIG. 2 the first variant of the device for filling a container in a second embodiment;

FIG. 3 a second variant of a device for filling a container; and

Figure 4:
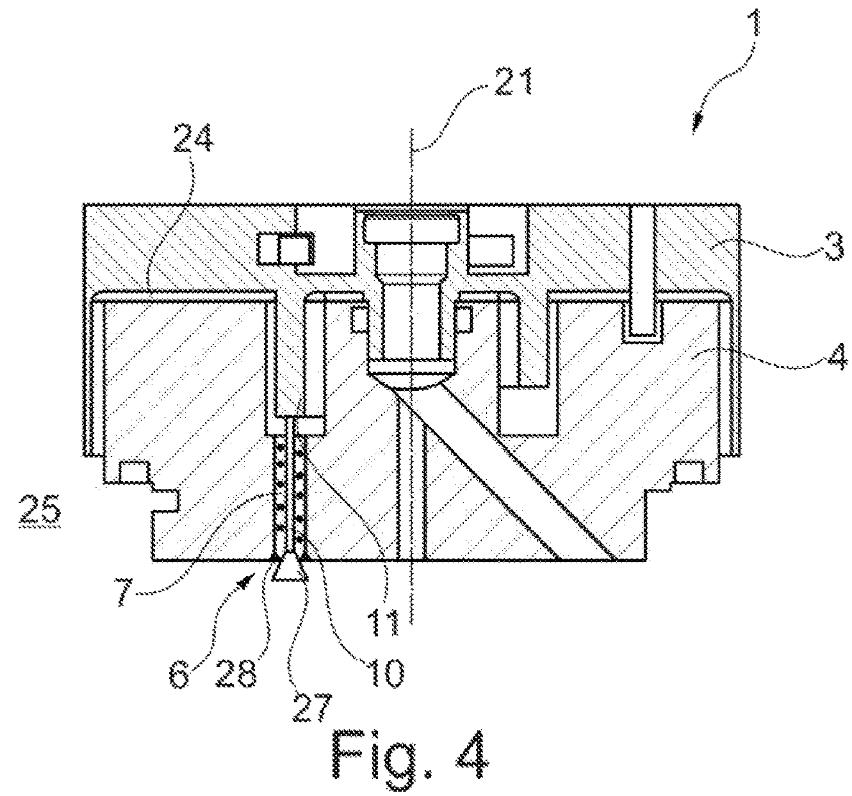

FIG. 4 a third variant of a device for filling a container.

FIG. 1 shows a first presentation of a longitudinal section of a first variant of a device 1 for filling a container 2 with a carbonated liquid. Device 1 comprises an upper part 3 and a lower part 4.

The upper part 3 has a coupling 15 on its top face 16, which is designed here in the manner of a bayonet connection. The coupling 15 is used to attach the upper part 3 to an outlet opening 17 of an outlet 18 of a sanitary fitting not shown here. A container port 5 is used to attach the container 2 to the lower part 4, which container port is also designed in the manner of a bayonet connection in this case. For this purpose, the opening 22 of the container 2 is inserted into the container port 5 and rotated. Liquid ducts 20 are formed in the upper part 3 and the lower part 4, through which liquid ducts the carbonated liquid can be routed from the outlet 18 into a receiving chamber 19 of the container 2.

FIG. 2 shows the first variant of the device 1 without the container 2 and the outlet 18. To attach the container 2 to the container port 5 of the lower part 4, the container 2 is rotated clockwise about an axis of rotation 21. When the container 2 is rotated, the container 2 attached to the lower part 4 rotates the lower part 4 about the axis of rotation 21 relative to the upper part 3 until a blocking element 13, which in this case is designed in the manner of a screw and engages with a groove 14 of the lower part 4, blocks any further rotation of the lower part 4 relative to the upper part 3. A thread 12 is formed between the lower part 4 and the upper part 3, such that the lower part 4 is screwed against a seal 8 of the upper part 3 during its rotation about the axis of rotation 21. This closes a vent duct 7 of the lower part 4 preventing any gases from escaping from the receiving chamber 19 of the container 2 shown in FIG. 1 via the vent duct 7 into an environment. The lower part 4 is therefore in a closed position 23 in FIG. 2. In the closed position 23, the container 2 can be filled with a carbonated liquid, which increases the pressure in the receiving chamber 19.

To detach the container 2 from the lower part 4, the container 2 is rotated counterclockwise around the axis of rotation 21. Owing to the pressure present in the receiving chamber 19, there is a friction connection between the container 2 and the lower part 4, so that the lower part 4 is rotated with the container 2 counterclockwise about the axis of rotation 21. This causes the lower part 4 to be rotated relative to the upper part 3 in the direction of a venting position 6 not shown here, until the blocking element 13 blocks any further rotational motion of the lower part 4. The thread 12 moves the lower part 4 away from the upper part 3 in parallel to the axis of rotation 21. In this way, the seal 8 is lifted from a longitudinal end of the vent duct 7, allowing gases to escape from the receiving chamber 19 (cf. FIG. 1) of the container 2 via the vent duct 7 and gap(s) 24 between the upper part 3 and the lower part 4 into an environment 25, causing the pressure in the receiving chamber 19 to drop to an ambient pressure. In this way, the container 2 can be easily detached from the lower part 4.

FIG. 3 shows a longitudinal section of a second variant of the device 1. The lower part 4 can also be rotated here in a limited manner relative to the upper part 3 about the axis of rotation 21 by a container 2 not shown here. In contrast to the first variant of the device 1 shown in FIGS. 1 and 2, in the second variant no thread 12 is formed between the upper part 3 and the lower part 4, i.e., the lower part 4 is not moved in parallel to the axis of rotation 21 during its rotary motion. In FIG. 3, the lower part 4 is in a venting position 6, in which the vent duct 7 is connected to a connection duct 9 of the upper part 3 via a venting opening 26 in the seal 8. In this way, gases can escape from the receiving chamber 19 of the container 2 (cf. FIG. 1) via the vent duct 7, the venting opening 26 in the seal 8 and the connection duct 9 into the environment 25 until the pressure in the receiving chamber 19 has dropped to an ambient pressure. When the lower part 4 is rotated to a closed position 23 not shown here, the seal 8 closes the vent duct 7. In all other respects, the design of the second variant of the device 1 is identical to that of the first variant of the device 1.

FIG. 4 shows a longitudinal section of a third variant of the device 1. In this variant, a spring element 10 is arranged in the vent duct 7 of the lower part 4, the valve head 27 of which spring element is pulled by a spring 29 onto a valve seat 28 at a longitudinal end of the vent duct 7 in a closed position 23 (not shown here) of the lower part 4. In this way, the vent duct 7 is closed in the closed position 23. A longitudinal end of the spring element 10 is supported on a ramp 11 of the upper part 3. The ramp 11 has a slope, i.e., when the lower part 4 is moved to the venting position 6 shown here, the spring element 10 moves (downwards) in parallel to the axis of rotation 21 and the valve head 27 is lifted off the valve seat 28. In this way, the vent duct 7 opens to let gases escape from the receiving chamber 19 of the container 2 shown in FIG. 1 via the vent duct 7 and gaps 24 between the upper part 3 and the lower part 4 into the environment 25 until the pressure in the receiving chamber 19 has dropped to the ambient pressure. In all other respects, the design of the third variant of the device 1 is identical to the first or second variant of the device 1.

This invention makes a container for a carbonated liquid particularly easy to detach.

LIST OF REFERENCE NUMERALS

1 Device
2 Container
3 Upper part
4 Lower part
5 Container port
6 Venting position
7 Vent duct
8 Seal
9 Connection duct
10 Spring element
11 Ramp
12 Thread
13 Blocking element
14 Groove
15 Coupling
16 Top face
17 Outlet opening
18 Outlet
19 Receiving chamber
20 Fluid duct
21 Axis of rotation
22 Opening
23 Closed position
24 Gap
25 Environment
26 Vent opening
27 Valve head
28 Valve seat
29 Spring

The invention claimed is:

1. A device (1) for filling a container (2) with a carbonated liquid, comprising at least:

an upper part (3) and a lower part (4) having a container port (5) for securing the container (2) to the device (1), wherein the lower part (4) is configured to be displaced within limits relative to the upper part (3) between a closed position (23) and a venting position (6), the container (2) is configured to displace the lower part (4) to the closed position (23) when the container (2) is secured to the container port (5), and the container (2) is configured to displace the lower part (4) to the venting position (6) when the container (2) is released from the container port (5), such that a high pressure in the container (2) is configured to be reduced in the venting position (6) of the lower part (4) prior to releasing the container (2) from the container port (5).

2. The device (1) according to claim 1, wherein a vent duct (7) of the lower part (4) is closed in the closed position (23) and open in the venting position (6).

3. The device (1) according to claim 2, wherein a seal (8) of the upper part (3) releases the vent duct (7) when the lower part (4) is moved into the venting position (6).

4. The device (1) according to claim 2, wherein the vent duct (7) is connected to a connection duct (9) of the upper part (3) when the lower part (4) is moved into the venting position (6).

5. The device (1) according to claim 2, wherein a spring element (10) releases the vent duct (7) when the lower part (4) is moved into the venting position (6).

6. The device (1) according to claim 5, wherein the spring element (10) is supported at the upper part (3).

7. The device (1) according to claim 6, wherein the spring element (10) is supported on a ramp (11) of the upper part (3), which ramp has a gradient in a direction of motion of the lower part (4).

8. The device (1) according to claim 1, wherein the upper part (3) and the lower part (4) are interconnected by a thread (12).

9. The device (1) according to claim 1, wherein a blocking element (13) of the upper part (3) limits a movability of the lower part (4) relative to the upper part (3).

10. A sanitary fitting, comprising an outlet (18) with an outlet opening (17), wherein a device (1) according to claim 1 is arranged at the outlet opening (17).

* * * * *